(12) United States Patent
Wilde et al.

(10) Patent No.: US 8,372,557 B2
(45) Date of Patent: Feb. 12, 2013

(54) GAS DIFFUSION LAYER

(75) Inventors: Peter Wilde, Meitingen (DE); Rüdiger-Bernd Schweiss, Augsberg (DE)

(73) Assignee: SGL Carbon SE, Wiesbaden (DE)

( * ) Notice: Subject to any disclaimer, the term of this patent is extended or adjusted under 35 U.S.C. 154(b) by 0 days.

(21) Appl. No.: 12/973,107

(22) Filed: Dec. 20, 2010

(65) Prior Publication Data

US 2011/0151352 A1 Jun. 23, 2011

Related U.S. Application Data

(63) Continuation of application No. PCT/EP2009/004460, filed on Jun. 19, 2009.

(30) Foreign Application Priority Data

Jun. 20, 2008 (DE) .......................... 10 2008 029 099

(51) Int. Cl.
   *H01M 8/10* (2006.01)
(52) U.S. Cl. ........................................ 429/481; 429/480

(58) Field of Classification Search .................. 429/480, 429/481

See application file for complete search history.

(56) References Cited

U.S. PATENT DOCUMENTS

| 6,350,539 | B1 | 2/2002 | Wood, III et al. | |
| 2003/0082374 | A1* | 5/2003 | Frisk et al. | ..................... 428/364 |
| 2003/0211380 | A1 | 11/2003 | Hiroi et al. | |
| 2006/0078784 | A1* | 4/2006 | Liu et al. | ......................... 429/42 |
| 2007/0099060 | A1 | 5/2007 | Lee et al. | |

FOREIGN PATENT DOCUMENTS

| DE | 102 60 501 A1 | 7/2004 |
| WO | 2006069249 A2 | 6/2006 |
| WO | 2007139940 A1 | 12/2007 |

* cited by examiner

*Primary Examiner* — Carlos Barcena
(74) *Attorney, Agent, or Firm* — Taylor IP, P.C.

(57) ABSTRACT

A carbon-fiber-based gas diffusion layer (GDL) for use in polymer electrolyte membrane (PEM) fuel cells (FC) having structured hydrophilic properties, wherein materials with hydrophilic properties and selected from the group of metal oxides in an average domain size of 0.5 to 80 μm are present as hydrophilic wicks in the gas diffusion layer.

12 Claims, 1 Drawing Sheet

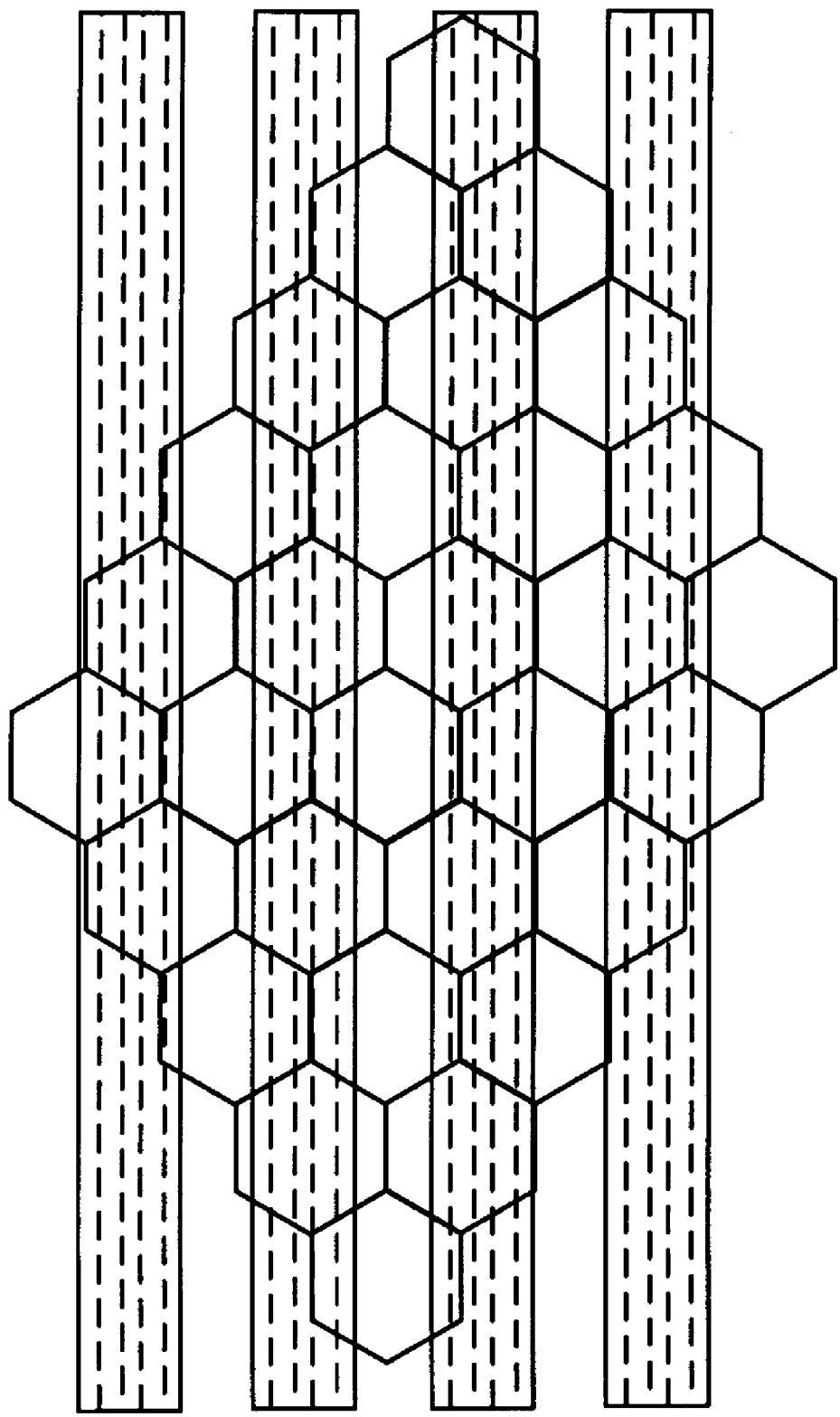

GAS DIFFUSION LAYER

CROSS REFERENCE TO RELATED APPLICATIONS

This is a continuation of PCT application No. PCT/EP2009/004460, entitled "GAS DIFFUSION LAYER", filed Jun. 19, 2009, which is incorporated herein by reference.

BACKGROUND OF THE INVENTION

1. Field of the Invention

The present invention relates to a carbon-fiber-based gas diffusion layer (GDL) having structured hydrophilic properties, which is used in polymer electrolyte membrane (PEM) fuel cells (FC).

2. Description of the Related Art

Fuel cells are highly efficient sources of energy in which fuel (typically gasses rich in hydrogen) and an oxidation agent (typically atmospheric oxygen) are electrochemically converted to water in catalyst layers on the two primary sides of a PEM. The electromechanical reaction generates electrical energy and causes the reactants to react, producing water. In this process, the PEM handles proton transport between the half cells, where the electrons are used via the electrodes and an external circuit to perform electrical work. The main problem of this type of fuel is cells balancing between the necessary moisture retention of the membrane and the bordering catalyst layer as well as conducting away the water produced, which otherwise fills the pores of the GDL, thereby impeding gas transport and reducing power output. The moisture level can be influenced and controlled by a series of factors. Moistening the anodic and cathodic reaction gas is often used as a means for setting the necessary moisture level. The working conditions (cell temperature, gas pressure and gas stoichiometry) are additional influencing parameters that influence the water content of the membrane and the GDL. Finally, the power range in which the fuel cell works also has a significant influence in balancing the water volume in the cell. Operating at high current densities causes a large volume of water to be produced, which must be controlled and guided so that optimal reliability and trouble-free operation is achieved.

A gas diffusion electrode with a layer for controlling the cross-diffusion of water is known from document DE 102 60 501 A1. In this example, a water cross-diffusion layer made of hydrophilic fibers, in particular hydrophilic carbon fibers, is provided between the microporous GDL and the macroporous GDL of the gas diffusion electrode.

A heat and water management device for PEM fuel cells is known from the document WO 2007/139940 A2. The device comprises a thermal and electrically conductive, hydrophilic heat and water transport element, which extends from the interior to the exterior of the cell and is arranged between the GDL and the current collector. The transport element is made of boron nitride, aluminum nitride, copper-, aluminum-, nickel-alloys, graphite, expanded graphite, graphite fabric, graphite paper, aluminum foam, stainless steel foam, nickel foam, polyvinyl alcohol foam, glass microfiber, wool fabric, cotton paper, cotton fabric, polyurethane foam, cellulose acetate, polyvinyl pyrrolidone or polyacrylamide.

What is needed in the art is a GDL configured to ensure effective water management and with which fuel cells can be controlled and operated in a simple manner even at continuous high power output.

SUMMARY OF THE INVENTION

The present invention provides a carbon fiber-based gas diffusion layer having structured hydrophilic properties ensuring effective water management and structured such that fuel cells can be effectively controlled and operated even at continuous high power output. The present invention further provides a method for manufacturing the GDL according to the present invention. More specifically, the present invention provides a carbon-based gas diffusion layer for a fuel cell with a polymer electrolyte membrane (PEM) having structured hydrophilic properties. The gas diffusion layer (GDL) includes a plurality of hydrophilic wicks formed of a plurality of materials having hydrophilic properties. The present invention further provides a carbon-based gas diffusion layer (GDL) for a membrane electrode unit, an electrochemical sensor or an electrolyte cell.

The materials are selected from a group of metal oxides and in an average domain size of approximately 0.5 to 80 micrometers (μm). These domains are hydrophilic and are separated from one another by hydrophobic domains. The hydrophobic domains include a polymer containing fluorine or a hydrophobic sol-gel. The hydrophobic domains may include, for example polytetrafluoroethylene (PTFE) or polyvinylidene fluoride (PVDF). Spacing between the hydrophilic domains ranges from between approximately 10 micrometers (μm) and 3 millimeters (mm).

The hydrophilic domains are further arranged in a pattern-like formation, for example a linear formation, a polygonal formation, a rhomboidal or a hexagonal formation. A surface area ratio of the hydrophilic domains to the hydrophobic domains ranges between approximately 10% and 90%, for example between approximately 40% and 60%.

According to the present invention, laterally predetermined paths are introduced into a GDL at which liquid water should collect to facilitate transport along these paths. The areas at the hydrophilic wicks should systematically draw away liquid water to ensure that the immediately neighboring pores remain free for gas transport.

These paths can be introduced, for example, by:
  incorporating hydrophilic fibers into the microporous layer (MPL);
  incorporating hydrophilic fibers into the interface MPL/catalyst;
  incorporating fibers into the interface substrate/MPL; and/or
  incorporating printed patterns with micro-/nanoscale, hydrophilic substances.

Inorganic fibers such as zirconium oxide aluminum oxide or mixed $Al_2O_3$—$SiO_2$ ("aluminum silicate") fibers are used as hydrophilic fibers. These fibers are cut or are available as ground fibers. Other possible hydrophilic substances are micro- or nanoscale $SiO_2$— (pyrogenic silicic acids, fumed silica), $TiO_2$—, $Al_2O_3$— or $B_2O_3$-based particles.

The lateral and vertical orientation of the hydrophilic wicks is important. In low and moderate load range, the ranges above the bars of the flow field, for example, contribute to the performance of the PEM fuel cell. There, the reaction products are, for example, formed as liquid water. Liquid water, which is formed above the bar, must be conducted to the canal at a right angle to the bar and an extensive flooding of the GDL must be avoided. Wick orientation must, therefore, ideally correspond to the flow field geometry. To achieve the most universal design possible, a honeycomb structure, as illustrated in FIG. 1, is proposed with a comb width having the same scale of the flow field structures. Similar simple polygonal structures are also suitable as an alternative option. This feature makes it easier for liquid water to flow from the reaction zone, while at the same time creating free space for the necessary transport of gas to the reaction site.

The transport paths for liquid water are varied in shape and form and are required in the three spatial directions. There is evidence that fluid water collects at the interface between the catalyst and MPL. This liquid water passes through the MPL as steam and then collects as liquid in the substrate. This crossing of the MPL as steam (vaporization and re-condensation) involves additional processes that reduce efficiency and kinetic energy. Transporting liquid water through the MPL along hydrophilic domains (in the Z direction) promises advantages in performance.

EXAMPLE 1

Carbon fiber paper of the type Sigracet® GDL 25 BA (SGL Technologies GmbH, Meitingen) is layered on a laboratory spreading knife with a coating paste (layer thickness of approximately 30-50 μm) and then sintered at approximately 350° C. for about 10 minutes. Various quantities of pre-ground aluminum oxide fibers (dispersed in water) are added to the coating paste (consisting of approximately 77% acetylene soot, 23% polytetrafluoroethylene (PTFE) and organic binding substance).

SAMPLE A: approximately 0.16% aluminum oxide fibers in relation to the solid matter content of the paste SAMPLE B: approximately 0.29% aluminum oxide fibers in relation to the solid matter content of the paste SAMPLE C: approximately 0.67% aluminum oxide fibers in relation to the solid matter content of the paste Just a small quantity of inorganic fibers in the coating will cause a significant hydrophilization of the surface (the surface without fibers is clearly hydrophobic owing to the PTFE portion in the layer). However, electrical resistance rises as the portion of fibers increases.

|  | Continuity resistance z [mΩ cm$^2$] | Water absorption [g m$^{-2}$ min$^{-1}$] | Angle of declination [°] |
| --- | --- | --- | --- |
| SAMPLE A | 9.1 | ~1 | 7-10 |
| SAMPLE B | 10.7 | 2-3 | 18-27 |
| SAMPLE C | 15.1 | 5-6 | 60-75 |

EXAMPLE 2

An aqueous dispersion of aluminum oxide fibers (approximately 0.01 to 0.05%, added binder/dispersant) is dehydrated in a vacuum via an uncoated GDL substrate located on a screen (e.g., sheet former/paper machine). Fiber deposits oriented along the x-y axes thereby form on the GDL. After drying, the GDL is provided with a microporous layer.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A carbon-fiber-based gas diffusion layer for a fuel cell with a polymer electrolyte membrane (PEM) having structured hydrophilic properties, the gas diffusion layer comprising:
 a plurality of hydrophilic wicks including a plurality of materials having hydrophilic properties, said materials selected from a group of metal oxides and in an average domain size of approximately 0.5 to 80 μm, wherein said domains are hydrophilic domains and are separated from one another by hydrophobic domains and a spacing between said hydrophilic domains ranges between approximately 10 μm and 3 mm.

2. The gas diffusion layer according to claim 1, wherein said metal oxides are at least one of silicon, aluminum, titanium, boron, tin, and zirconium.

3. The gas diffusion layer according to claim 1, wherein said hydrophobic domains include one of a polymer containing fluorine and a hydrophobic sol-gel.

4. The gas diffusion layer according to claim 3, wherein said hydrophobic domains include one of polytetrafluoroethylene (PTFE) and polyvinylidene fluoride (PVDF).

5. The gas diffusion layer according to claim 1, wherein said hydrophilic domains are arranged in a pattern-like formation.

6. The gas diffusion layer according to claim 5, wherein said hydrophilic domains are arranged in a linear formation.

7. The gas diffusion layer according to claim 5, wherein said hydrophilic domains are arranged in a polygonal formation.

8. The gas diffusion layer according to claim 5, wherein said hydrophilic domains are arranged in one of a rhomboidal and a hexagonal formation.

9. The gas diffusion layer according to claim 8, wherein a surface area ratio of said hydrophilic domains to said hydrophobic domains ranges between approximately 10% and 90%.

10. The gas diffusion layer according to claim 9, wherein said surface area ratio of said hydrophilic domains to said hydrophobic domains ranges between approximately 40% and 60%.

11. The gas diffusion layer according to claim 10, wherein said hydrophilic domains are formed from one of particles and fibers.

12. A carbon-fiber-based gas diffusion layer having structured hydrophilic properties, the gas diffusion layer comprising:
 a plurality of hydrophilic wicks including a plurality of materials having hydrophilic properties, said materials selected from a group of metal oxides and in an average domain size of approximately 0.5 to 80 μm, wherein said domains are hydrophilic domains and are separated from one another by hydrophobic domains and a spacing between said hydrophilic domains ranges between 10 μm and 3 mm, wherein the gas diffusion layer is in one of a membrane electrode unit, a polymer electrolyte membrane (PEM) fuel cell, an electrochemical sensor and an electrolyte cell.

* * * * *

UNITED STATES PATENT AND TRADEMARK OFFICE
CERTIFICATE OF CORRECTION

| | | |
|---|---|---|
| PATENT NO. | : 8,372,557 B2 | Page 1 of 1 |
| APPLICATION NO. | : 12/973107 | |
| DATED | : February 12, 2013 | |
| INVENTOR(S) | : Wilde et al. | |

It is certified that error appears in the above-identified patent and that said Letters Patent is hereby corrected as shown below:

In the Specification

COLUMN 2
  Line 46, please delete "zirconium oxide aluminum oxide", and substitute therefore --zirconium oxide, tin oxide, aluminum oxide--.

Signed and Sealed this
Sixteenth Day of September, 2014

Michelle K. Lee
*Deputy Director of the United States Patent and Trademark Office*